United States Patent
Callahan, Jr.

[15] 3,694,010
[45] Sept. 26, 1972

[54] TUBE COUPLING FOR LARGE DIAMETER TUBES

[72] Inventor: Francis J. Callahan, Jr., Chagrin Falls, Ohio

[73] Assignee: Crawford Fitting Company, Solon, Ohio

[22] Filed: Oct. 5, 1970

[21] Appl. No.: 78,052

[52] U.S. Cl............................285/334.4, 285/417
[51] Int. Cl..............................................F16l 25/00
[58] Field of Search.....285/DIG. 18, 386, 334.4, 417

[56]  References Cited

UNITED STATES PATENTS

| | | |
|---|---|---|
| 3,572,775 | 3/1971 | Bloom...................285/334.4 |
| 3,103,373 | 9/1963 | Lennon et al.............285/342 |
| 920,963 | 5/1909 | Keyes.....................285/386 X |
| 1,815,002 | 7/1931 | Beecher..............285/334.4 X |
| 2,484,815 | 10/1949 | Crawford..................285/341 |

*Primary Examiner*—Andrew V. Kundrat
*Attorney*—Fay, Sharpe and Mulholland

[57] ABSTRACT

A tube coupling for large diameter tubes is comprised of a coupling body having a camming mouth, a tube stub with an integra ferrule, and a coupling nut adapted to retain the ferrule of the tube stub in sealing engagement with the camming mouth. The tube stub is adapted to be interconnected into a fluid line by welding or otherwise securing the free end of the tube stub to a tube or other conduit.

13 Claims, 4 Drawing Figures

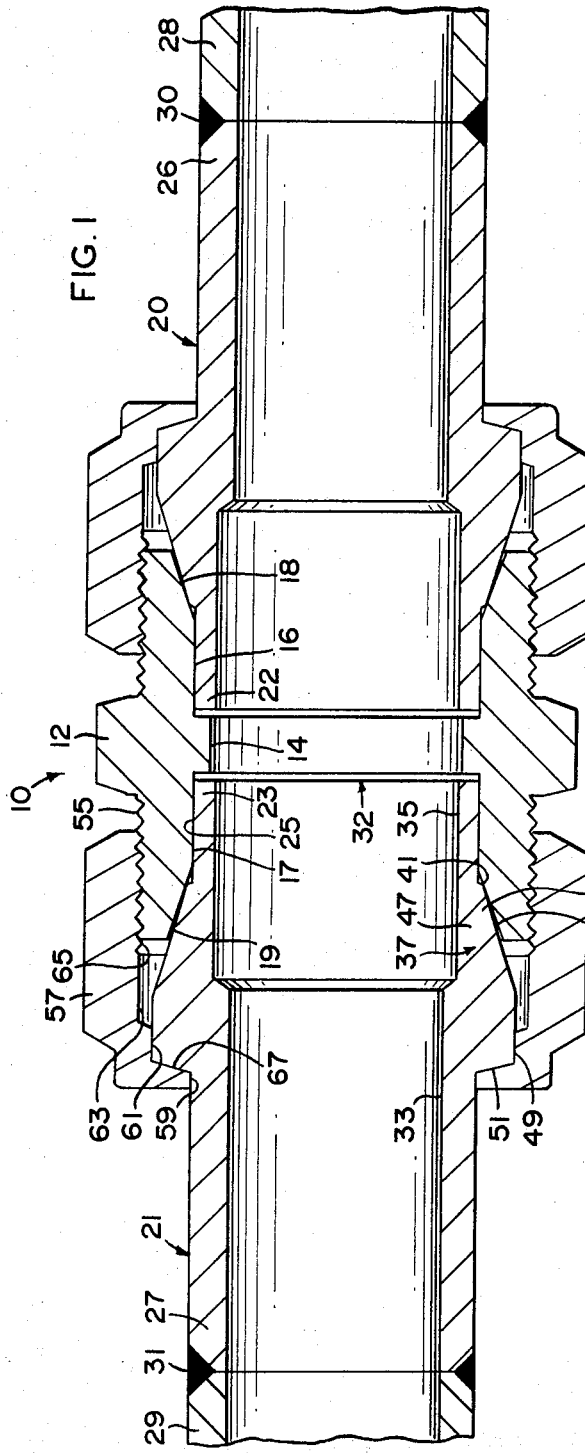
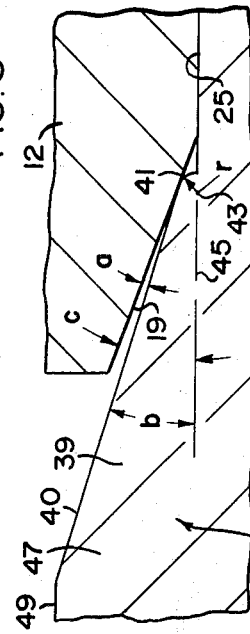
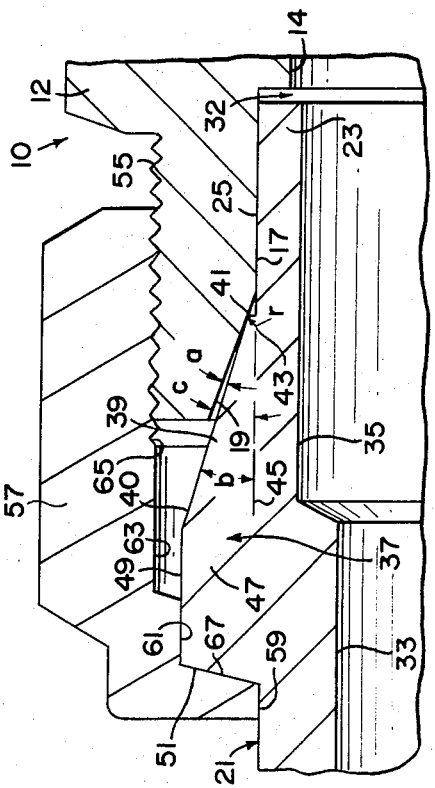

3,694,010

TUBE COUPLING FOR LARGE DIAMETER TUBES

BACKGROUND OF THE INVENTION

This invention relates to couplings particularly adapted for large diameter tubes.

In many installations the joining of large diameter tubes on the order of 1 ½, 2 or 3 inches or more has been accomplished by field welding of the tubes. While the placing of a field weld on a tube is of itself not particularly objectionable, the nature of a welded joint makes it impossible to break the joint in the event that it is desired to modify the tube installation at a later time.

This invention is directed to tube couplings for large diameter tubes and wherein the joint may be readily broken and remade if desired.

BRIEF SUMMARY OF THE INVENTION

Briefly summarized, the tube coupling of this invention comprises a coupling body having a bore and a counterbore. The counterbore is substantially cylindrical throughout at least a portion of its length and is provided with a coaxial rearwardly opening generally frusto-conical camming mouth. A tube stub having a cylindrical first end is disposed within the counterbore of the coupling body. The tube stub is further provided with a second end adapted to be secured to a tube, and an integral intermediate ferrule defined by an outwardly expanded nose adapted to be placed in wedging contact with the camming mouth. The intermediate ferrule of the tube stub is in turn provided with a back face adapted to cooperate with a coupling nut threadedly engaged with the coupling body. Threading of the coupling nut onto the coupling body advances the nose of the ferrule into a wedging engagement with the camming mouth a sufficient degree to establish a seal upon make-up of the coupling. A slip ring may optionally be provided between the ferrule and the coupling nut to eliminate galling and wear of the ferrule and coupling nut upon make-up of the coupling.

DESCRIPTION OF THE DRAWINGS

A more complete description of the coupling of this invention will be made with reference to the accompanying drawings in which:

FIG. 1 is an elevational cross-sectional view of a coupling embodying the principles of this invention;

FIG. 2 is an enlarged elevational cross-sectional view of the camming mouth and tube stub of the coupling of this invention;

FIG. 3 is an enlarged elevational cross-sectional view and showing in detail the relationship of the nose of the tube stub and the coupling body camming mouth; and FIG. 4 is an elevational cross-sectional view of a tube coupling embodying the principles of this invention in which a slip ring is disposed between the ferrule and the coupling nut.

DESCRIPTION OF THE INVENTION

Referring now to FIG. 1, there is shown a coupling 10 comprised of a coupling body 12 having a bore 14. A counterbore 16 is provided at one end of body 12 and a coaxial rearwardly opening generally frusto-conical camming mouth 18 extends from the cylindrical wall defining counterbore 16.

Since the coupling body of FIG. 1 is in the form of a union, a second counterbore 17 and a second camming mouth 19 are defined in the body.

A pair of tube stubs 20, 21 have their respective first ends 22, 23 disposed within the body 12. The tube stubs are in turn provided with second ends 26, 27 adapted to be secured to tubes 28, 29 by means of welds 30, 31.

Since the respective couplings joining each of the tubes 28, 29 to the coupling body 12 are identical in FIG. 1, the description of the invention will now be directed to the coupling interconnecting the tube 29 to the body 12. It should be understood that the coupling body 12 may take several forms such as a male connector, female elbow, union elbow, union tee, or other fitting form known to those skilled in the art. Alternately, the counterbore and camming mouth of the coupling body may be provided in a valve or other apparatus to which it is desired to join a tube.

Turning now to FIG. 2, it will be seen that the counterbore 17 of coupling body 12 is essentially cylindrical throughout its length. The first end 23 of tube stub 21 is provided with a generally cylindrical exterior surface 25 which is adapted to be received within counterbore 17.

Counterbore 17 is of sufficient length that a clearance 32 is provided between the tube stub and the coupling body in order that the tube stub will not bottom on the coupling body during make-up of the coupling.

A bore 33 is defined in the tube stub 21 and, in the preferred embodiment of the invention as shown in FIG. 2, a counterbore 35 is defined at the first end 23. Counterbore 35 serves to reduce the thickness of the tube stub wall at the first end for the purpose of reducing the rigidity of the tube stub in the sealing area thus enhancing sealing on make-up.

An integral intermediate ferrule 37 is provided between the first and second ends of the tube stub and is defined by a body 47 and an outwardly expanded nose 39 having an exterior surface 40 substantially in the form of a right circular forwardly converging conical frustum. The forward end of the nose terminates with a curved apical zone 41.

As is shown in FIG. 2, the external surface 40 of nose 39, prior to make-up of the coupling, defines a half-angle b with respect to the axis of the tube stub 21 that is less than the half-angle c defined by the camming mouth 19 with respect to the axis of the coupling body counterbore.

As used herein, the angle defined by a frusto-conical surface in section with respect to its axis will be referred to as the half-angle. Half-angle is thus to be differentiated from the full or included angle (defined by the complete frusto-conical surface in section), which is twice the half-angle.

In the preferred embodiment of the invention, the camming mouth 19 defines a half-angle of approximately 20° with respect to the axis of counterbore 17. The external surface 40 defines a half-angle of approximately 17°–18° with respect to the axis of bore 33. The difference in half-angles defined by the respective camming mouth and the external surface of the nose (angle a of FIG. 2) is thus approximately 2°–3°. This invention should not be considered as limited to the specific angles described as it has been determined that the difference in the half-angles defined by the camming mouth and the external surface of the nose may be within the range of about 1°-5° or more depending on various factors such as tube diameter, materials employed and other considerations.

In FIG. 3, an enlarged cross-sectional view of the curved apical zone 41 of the nose is shown. The curved apical zone 41 is defined by a radius $r$ drawn from a center 43. In the preferred embodiment, the center 43 is located in the plane of the cylindrical exterior surface 25 of the first end of the tube stub. The phantom line 45 of FIG. 3 denotes the imaginary extension of the cylindrical exterior surface 25 into the nose 39. Other locations for the center 43 either above or below the plane of the surface 25 should be considered as being within the scope of the invention.

In the preferred embodiment, the radius $r$ has a length of 0.010 inches although larger or smaller radii may be considered within the scope of the invention as conditions change.

Turning once again to FIG. 2, nose 39 merges into body 47 of the ferrule. Body 47 is, in turn, provided with a side face 49 and a back face 51. Side face 49 is generally cylindrical being coaxial with the axis of tube stub 21. Back face 51, in the preferred embodiment, defines a generally frusto-conical surface.

Threadedly received on external threads 55 of the coupling body is a coupling nut 57. A bore 59 and counterbores 61 and 63 are defined in the coupling nut. Internal threads 65, complementary to external threads 55, are provided in the wall defining counterbore 63. A generally frusto-conical thrust surface 67 interconnects the wall defining bore 59 and the wall defining counterbore 61. Thrust surface 67 is generally complementary to back face 51 of the body 47 although the half-angles defined by the surface 67 and face 51 need not necessarily coincide.

In the embodiment of FIG. 2, thrust surface 67 directly contacts back face 51 such that advancement of the coupling nut 57 onto the coupling body will advance nose 39 of the ferrule into sealing engagement with the camming mouth 19.

In a modified form of the invention as shown in FIG. 4, the ferrule 70 of tube stub 72 is provided with a generally cylindrical back face 74. A slip ring 76 is disposed between back face 74 and thrust surface 78 of coupling nut 80. The side faces of slip ring 76 are generally complementary to the back face 74 and thrust surface 78.

Slip ring 76 functions to reduce galling and wear on the coupling nut 80 and the ferrule 70 as the coupling is made-up. Furthermore, the slip ring reduces the tendency of the tube stub to rotate as the fitting is made-up. Such rotation is undesirable if a tube is welded to the tube stub as is shown in FIG. 1. In the event that the tube stub is unduly twisted during make-up, the integrity of the weld 30 could be lessened.

As will be observed in FIG. 2, the diameter of the cylindrical wall defining counterbore 61 slightly exceeds the diameter of the side face 49 of the ferrule 37. The wall defining counterbore 61 of coupling nut 57 is thus disposed closely adjacent the side face 49 of ferrule 37 and serves both to strengthen the thrust surface 67 of coupling nut 57 during make-up of the coupling as well as give support and proper alignment for the ferrule 37 during make-up.

OPERATION OF THE COUPLING

The operation of the coupling of this invention will now be described with reference to FIG. 2. After insertion of the cylindrical exterior surface 25 of tube stub 21 into counterbore 17 of the coupling body 12, the coupling nut 57 is advanced onto the coupling body 12 by means of interengaging threads 55, 65 until the coupling nut is in a finger tight condition with the curved apical zone 41 seated against camming mouth 19 in initial nonpressure contact along a line of predetermined diameter. Further torquing of the coupling nut 57 will cause the thrust surface 67 to contact back face 51 thus to advance nose 39 into camming mouth 19 in a wedging action.

Sealing is established on make-up as essentially line contact between the curved apical zone 41 and the camming mouth 19 is changed into area contact of at least a portion of external surface 40 and camming mouth 19.

As was previously noted, in the preferred embodiment the center 43 of the radius defining the curved apical zone 41 lies in the imaginary extension of the plane of the cylindrical external surface 25 of the tube stub. This relationship of the center of the radius to the exterior surface of the tube stub, in effect, reduces the thickness of the integral ferrule 37 in the contact area. Consequently, the ferrule is somewhat less rigid than if the center of the radius were located within the nose of the ferrule. Greater flexibility may be achieved by locating the center below the plane of exterior surface 25 in the body of the tube stub itself. With a more flexible ferrule the danger of the ferrule indenting the camming mouth of the body is reduced.

Since the counterbore 35 serves to reduce the rigidity of the tube stub in the sealing or contact area, the degree of flexibility of the tube stub may be controlled somewhat by selecting an appropriate diameter for counterbore 35.

The sealing condition that the coupling of this invention achieves on make-up is one approximating the sealing condition of a more or less conventional front ferrule such as is shown in the Lennon U.S. Pat. No. 3,103,373 once it has been deformed on make-up. Stated another way, this invention approximates the sealing condition obtained at the front ferrule of a conventional ferrule type fitting without the degree of deformation required in the front ferrule of conventional fittings. In this regard, it should be noted that the deformation imparted to the front ferrule of a conventional ferrule type fitting is difficult to achieve in larger diameter fittings due to the increased torque required and the limitations of ordinary hand tools. Accordingly, the coupling of this invention is designed to achieve the sealing of conventional ferrule type fittings without the degree of deformation required in conventional ferrule type fittings.

The location of the center of the radius of the curved apical zone, as previously noted, is one design consideration that contributes to the effectiveness of this invention.

The thickness of the tube stub at the first end is another consideration contributing to the effectiveness of this invention.

A third design consideration contributing to this invention is the taper difference between the external surface of the nose of the ferrule and the camming mouth. In the preferred embodiment, this taper difference is on the order of 2°–3° as opposed to a 5° or more taper difference experienced in connection with the design of conventional ferrule type fittings. The reason for the dissimilarity in taper difference in conventional ferrule type couplings and the coupling of this invention can be understood when it is noted that the coupling of this invention is designed to be made-up by turning the coupling nut one fourth of a turn from the finger tight position. In the conventional ferrule type fitting as shown in the Lennon patent, approximately one and one fourth turns of the coupling nut are required to make-up the fitting from a finger tight position. In the conventional fitting, however, the coupling nut serves to both swage the ferrule and establish a seal. In the tube coupling of this invention the coupling nut does not function so much to swage the tube stub as it does to provide a wedging action sufficient to establish a seal.

Since the ferrule is integral with the tube stub, this invention does not require the tight sealing and gripping of the tube by the ferrule as does the conventional ferrule type fitting wherein the ferrule is provided as a separate sleeve into which the tube is received.

ADVANTAGES OF THE INVENTION

A principal advantage of the tube coupling of this invention is that it may be used with large diameter heavy wall tubes. The high torque requirement imposed by conventional ferrule type fittings where heavy wall tubing is used or where tube diameter becomes relatively large has been overcome as the coupling of this invention does not require high torque in order to deform a ferrule. Rather, the torque requirement of this invention is limited to that necessary to achieve a wedging action to establish a seal on make-up.

Another advantage of the coupling of this invention is that once made up the coupling may be broken and remade when desired. There is no requirement to weld a second time.

In the coupling of this invention, the tube stub and coupling body may be fabricated from any desired material to suit any condition.

The length of the tube stub itself may be varied in order to provide greater flexibility to the installer in laying out the system and placing welds.

MODIFICATIONS OF THE INVENTION

While in the preferred embodiment of the invention the ferrule is comprised of a nose 39 and a body 47, other ferrule designs should be considered within the spirit of the invention. As an example, the ferrule could be provided with a radially extending rear flange such as flange 30 of the rear ferrule of the Crawford U.S. Pat. No. 2,484,815.

It should be understood that since sealing in the coupling of this invention is achieved by the nose in contact with the camming mouth, the structure of the ferrule immediately behind the nose (and not in abutment with the camming mouth) may take many forms depending upon the particular requirement of the coupling. In an extreme case, the ferrule could take the form of a nose with no body being provided whatsoever.

While in the preferred embodiment a weld 30 is used to secure tube 28 to the tube stub 20, other connection means well known to those skilled in the art may be employed.

As an alternative to providing a tube stub with an integral ferrule, two-piece structures wherein a separate ferrule is securely attached to the tube stub should be considered within the spirit of the invention. Such connecting means as threads, grooves, pins, keys, or other such elements may be used for the purpose of securing a ferrule to a tube stub.

The invention claimed is:

1. A tube coupling comprising:

a coupling body having a bore and a counterbore, said counterbore being substantially cylindrical throughout a portion of its length and being provided with a coaxial rearwardly opening, generally frusto-conical camming mouth;

a tube stub having a bore, a first end defined by a substantially cylindrical exterior surface and a second end adapted to be secured to a tube;

said tube stub having a ferrule defined by an outwardly expanded nose with an external surface having substantially the form of a right circular forwardly converging conical frustum, said external surface of said nose prior to make-up of the coupling, defining a half-angle with respect to the axis of the tube stub bore less than that defined by said camming mouth with respect to the axis of the coupling body bore, the forward end of said nose terminating with a curved apical zone seated against said camming mouth in initial nonpressure contact along a line of predetermined diameter, said curved apical zone being defined by a radius drawn from a center;

said center being located substantially in the plane of said cylindrical external surface of said first end of said tube stub;

said curved apical zone intersecting said cylindrical exterior surface of said first end of said tube stub;

said ferrule further being provided with a back face;

a coupling nut threadedly engaged with the body and provided with a coaxial internal thrust surface disposed in axially spaced opposition to the camming mouth and cooperable with said back face to advance said nose into said camming mouth in a wedging action sufficient to establish a seal upon make-up of the coupling.

2. The of claim 1 in which the difference in half-angles defined by said external surface of said nose and said camming mouth is in the range of about 2° to 3°.

3. A tube coupling comprising:

a coupling body having a bore and a counterbore, said counterbore being substantially cylindrical throughout a portion of its length and being provided with a coaxial rearwardly opening, generally frusto-conical camming mouth;

a tube stub having a bore, a first end defined by a substantially cylindrical exterior surface and a second end adapted to be secured to a tube;

said tube stub having a ferrule defined by an outwardly expanded nose with an external surface having substantially the form of a right circular forwardly converging conical frustum, said external surface of said nose prior to make-up of the coupling, defining a half-angle with respect to the axis of the tube stub bore less than that defined by said camming mouth with respect to the axis of the coupling body bore, the difference in half-angles defined by said external surface of said nose and said camming mouth being in the range of 2° to 3°, the forward end of said nose terminating with a curved apical zone seated against said camming mouth in initial nonpressure contact along a line of predetermined diameter, said curved apical zone being defined by a radius drawn from a center;

said ferrule further being provided with a back face;

a coupling nut threadedly engaged with the body and provided with a coaxial internal thrust surface disposed in axially spaced opposition to the camming mouth and cooperable with said back face to advance said nose into said camming mouth in a wedging action sufficient to establish a seal upon make-up of the coupling.

4. The invention of claim 3 in which said center is located substantially in the plane of said cylindrical exterior surface of said first end of said tube stub.

5. A tube coupling comprising:
a coupling body having a bore and a counterbore, said counterbore being substantially cylindrical throughout a portion of its length and being provided with a coaxial rearwardly opening, generally frusto-conical camming mouth;

a tube stub having a bore, a first end defined by a substantially cylindrical exterior surface and a second end adapted to be secured to a tube;

said tube stub having a ferrule defined by an outwardly expanded nose with an external surface having substantially the form of a right circular forwardly converging conical frustum, said external surface of said nose prior to make-up of the coupling, defining a half-angle with respect to the axis of the tube stub bore less than that defined by said camming mouth with respect to the axis of the coupling body bore, the forward end of said nose terminating with a curved apical zone seated against said camming mouth in initial nonpressure contact along a line of predetermined diameter, said curved apical zone being defined by a radius drawn from a center, said center being located in the plane of said cylindrical exterior surface of said first end of said tube stub;

said ferrule further being provided with a back face;

a coupling nut threadedly engaged with the body and provided with a coaxial internal thrust surface disposed in axially spaced opposition to the camming mouth and cooperable with said back face to advance said nose into said camming mouth in a wedging action sufficient to establish a seal upon make-up of the coupling.

6. The invention of claim 5 in which the difference in half-angles defined by said external surface of said nose and said camming mouth is in the range of about 2° to 3°.

7. The invention of claim 5 in which said thrust surface is defined as a rearwardly converging generally frusto-conical surface.

8. The invention of claim 5 in which said thrust surface contacts said back face upon make-up of the coupling.

9. The invention of claim 5 in which a slip ring is disposed between said thrust surface and said back face.

10. The invention of claim 5 in which said ferrule is integral with said tube stub.

11. The invention of claim 5 in which said ferrule is provided with a body and said back face is defined on said body.

12. The invention of claim 11 in which said body includes a generally cylindrical surface having an axis parallel to the axis of said tube stub and said coupling nut is provided with an internal generally cylindrical surface disposed closely adjacent said surface of said body.

13. A tube coupling comprising:
a coupling body having a bore and a counterbore, said counterbore being substantially cylindrical throughout a portion of its length and being provided with a coaxial rearwardly opening, generally frusto-conical camming mouth;

a tube stub having a bore, a first end defined by a substantially cylindrical exterior surface and a second end adapted to be secured to a tube;

said tube stub having a ferrule defined by an outwardly expanded nose with an external surface having substantially the form of a right circular forwardly converging conical frustum, said external surface of said nose prior to make-up of the coupling, defining a half-angle with respect to the axis of the tube stub bore less than that defined by said camming mouth with respect to the axis of the coupling body bore, the forward end of said nose terminating with a curved apical zone seated against said camming mouth in initial nonpressure contact along a line of predetermined diameter, said curved apical zone being defined by a radius drawn from a center;

a counterbore provided in said tube stub at said first end, said counterbore extending into said tube stub a distance sufficient to reduce the wall thickness of said tube stub in the area of contact of said nose and said camming mouth;

said ferrule further being provided with a back face;

a coupling nut threadedly engaged with the body and provided with a coaxial internal thrust surface disposed in axially spaced opposition to the camming mouth and cooperable with said back face to advance said nose into said camming mouth in a wedging action sufficient to establish a seal upon make-up of the coupling.

* * * * *